United States Patent [19]
Johnson

[11] Patent Number: 5,499,689
[45] Date of Patent: Mar. 19, 1996

[54] MOTORCYCLE CONVERSION REAR AXLE MOUNTING SYSTEM

[76] Inventor: Frank L. Johnson, 20839 FM 15, Troup, Tex. 75789

[21] Appl. No.: 289,878

[22] Filed: Aug. 12, 1994

[51] Int. Cl.[6] .................................................. B62K 13/04
[52] U.S. Cl. ............................................. 180/16; 180/209
[58] Field of Search .................................... 180/209, 210, 180/219, 16

[56] References Cited

U.S. PATENT DOCUMENTS

| | | | |
|---|---|---|---|
| 1,956,319 | 4/1934 | Du Pont et al. | 180/16 |
| 4,287,960 | 9/1981 | McConnell | 180/16 |

Primary Examiner—Mitchell J. Hill
Attorney, Agent, or Firm—Ronald B. Sefrna

[57] ABSTRACT

An adjustable apparatus for mounting a rear axle to a motorcycle frame in a process of converting a two wheel motorcycle to a three wheel motorcycle includes a pair of mounting plates to be connected to the rear axle, a pair of mounting arms to be connected between the mounting plates and the original motorcycle frame, and adjustable connecting joints to be disposed between the mounting arms and the mounting plates and between the mounting arms and the original motorcycle frame. The alignment of the rear axle relative to the longitudinal axis and line of travel of the motorcycle may be adjusted by adjusting the connecting joints to effectively shorten or lengthen the effective length of the mounting arms.

1 Claim, 6 Drawing Sheets

MOTORCYCLE CONVERSION REAR AXLE MOUNTING SYSTEM

FIELD OF THE INVENTION

The present invention generally relates to the field of vehicular apparatus, and in some of its embodiments more specifically relates to an adjustable rear axle mounting apparatus for a three wheeled converted motorcycle vehicle.

BACKGROUND OF THE INVENTION

Motorcycles have been used as a means of automotive transportation and as a means of recreation for many years, and throughout much of that time people have modified the conventional two wheel motorcycle structure to provide a third wheel, for additional stability, increased cargo capacity, etc. One of the earliest used modifications involved the addition of a sidecar, which increased the carrying capacity and improved stability in some respects, so long as the motorcycle was traveling in essentially a straight line. One of the major disadvantages of the sidecar, however, is that it decreases stability and control during cornering. Since the sidecar extends from one side of the motorcycle, the resulting structure is non-symmetrical, requiring different control techniques during cornering, depending upon the direction of the turn and the speed of the motorcycle.

Another approach to modification has been to create a tricycle structure by removing the original rear wheel of the motorcycle and replacing it with a pair of rear wheels at each end of a rigid axle. The tricycle configuration is a significant improvement over the sidecar in terms of symmetry and straight line stability, but conventional tricycle designs have continued to experience problems and disadvantages. In the conventional tricycle structure the rigid rear axle is connected to an extension frame that is rigidly attached to the original motorcycle frame, and it is critical that the extension frame and rear axle be correctly aligned in order to track properly as the vehicle is driven. Specifically, the axle must be in essentially perfect perpendicular alignment with the longitudinal axis of the motorcycle frame, and thus with the line of travel of the motorcycle.

The vast majority of three wheel motorcycles are conversions from two wheel motorcycles, constructed from commercially available conversion kits. The conversion systems of the prior art provide non-adjustable rear axle mounting assemblies for connection of a rigid rear axle to the original motorcycle frame. There are two primary functional disadvantages inherent in non-adjustable mounting assemblies: 1. manufacturing control must be very precise with very low tolerance for deviation from exact dimensional specifications (typically within a few thousandths of an inch), and 2. the user of the three wheel motorcycle is unable to adjust the rear axle alignment either during construction or during the useful life of the motorcycle.

There is a further disadvantage associated with the rear axle mounting system of prior art three wheel motorcycle conversion kits. The prior art systems typically utilize a unitary extension frame that connects to the original motorcycle frame at the mounting points for the original rear wheel suspension assembly and extends rearward, with the axle connected to that frame extension. Those extension frames connect to the outside of the original motorcycle frame, thus increasing the width of the three wheel frame between the original frame and the rear axle. The increased width occupies space that would otherwise be available for, e.g., the feel and legs of a passenger, and detracts from the aesthetic appearance of the three wheel design.

There remains a need for a three wheel motorcycle axle mounting system that provides a means for adjustment of the rear axle alignment both during conversion and after, that reduces the cost associated with the high degree of manufacturing precision required for prior art systems, that provides increased passenger room in comparison to prior art systems, and that improves the aesthetic appearance of the converted three wheel motorcycle. It is among the objects of the present invention to provide an adjustable three wheel motorcycle rear axle mounting system. It is also among the objects of the invention to provide an axle mounting system that minimizes interference with available passenger room and that is aesthetically pleasing in appearance. It is further among the objects of the invention to provide a rear axle mounting assembly that may be easily and economically manufactured and easily installed and adjusted. It is additionally among the objects of the invention to provide a rear axle mounting assembly in kit form for conversion of a conventional two wheel motorcycle to a three wheel motorcycle.

SUMMARY OF THE INVENTION

The present invention provides an economical three wheel motorcycle rear axle mounting apparatus and system that substantially eliminates the problems and disadvantages of the prior art. The rear axle mounting apparatus is designed to be provided as part of a kit for use in conversion of a conventional shaft driven two wheel motorcycle to a three wheel motorcycle structure.

In general, the conversion of a shaft driven two wheel motorcycle to a three wheel motorcycle is accomplished by removing the rear wheel assembly and other rear components such as fender, lights, etc. from the two wheel motorcycle, connecting a rear axle mounting assembly to the original frame structure, connecting a drive axle to the axle mounting assembly, and connecting a driveshaft between the original transmission system and the rear axle differential. The full conversion also involves addition of a body shell, lights, brakes, and other completion and trim steps which are not directly relevant to the present invention.

The frame of a conventional two wheeled motorcycle is laterally symmetrical on either side of the longitudinal axis of the motorcycle, and is constructed with a removable rear wheel mounting assembly or frame. Each side of the motorcycle body frame includes frame members that come together to provide a mounting point for that side of the rear wheel assembly. The connection between the body frame and the rear wheel assembly at those mounting points is formed with a bolt or pin that extends through a sleeve or pin aperture mounting point at the connected ends of the body frame members. In the two wheel motorcycle design, the rear wheel assembly members are disposed between the two sides of the body frame and are connected on the inside of the pin aperture.

The conversion kit rear axle mounting apparatus of the invention generally comprises a pair of mounting arms to be connected between the existing mounting points of the two wheel body frame of the motorcycle to be converted and the new rear axle to be installed, and a pair of mounting plates to be connected to the rear axle to receive the mounting arms. Each of the mounting arms is formed in an elongated "A-frame" or "wishbone" configuration, with an upper frame member, a lower frame member connected at one end to the upper frame member and extending alongside the upper frame member, and a short connecting member extending between the upper and lower frame members Each mounting arm also includes connecting joints at each end of the upper member and the free end of the lower member, thus providing a single first connecting joint at the first end of the mounting arm and two second connecting joints at the second end of the mounting arm. Each of the connecting joints is adjustable attached to the respective frame member of the mounting arm, so that each joint may be adjusted relative to the associated frame member along the longitudinal axis of that member. As the position of the connecting joints is adjusted relative to the mounting arm frame members, the overall length of the mounting arm is increased or decreased accordingly.

Each connecting joint comprises a joint head with a threaded shaft extending outward from the joint head. The threaded shaft is received in the respective end of the respective mounting arm frame member in telescoping relation therewith, and each end of each such frame member is adapted to receive the respective threaded shaft so that the distance of extension of the shaft from the frame member end may be adjusted by rotating the threaded shaft relative to the end of the frame member. Each first connecting joint also includes a pin attached to and extending outward from the joint head perpendicular to the threaded shaft, to be received in the pin aperture of the motorcycle body frame to which the original rear wheel assembly was connected. Each of the second connecting joints similarly includes a threaded pin extending from the joint head perpendicular to the threaded shaft.

Each mounting plate comprises a generally flat plate to be connected to the outer surface of the rear axle for attachment of the rear axle to one of the mounting arms. Each mounting plate includes a pair of plate apertures to align with the second connecting joints at the second end of the associated mounting arm and receive a connecting pin or bolt therethrough.

The apparatus of the invention is used to mount a conventional-type rear axle to the original motorcycle frame by rigidly connecting the two mounting plates to the rear axle with each plate between the differential and the wheel hub on each side of the axle. The mounting plates are connected to the axle with their plate apertures in alignment on respective alignment axes parallel to the axis of the axle. The second end of each mounting arm is connected to the associated mounting plate by extending the threaded pins of the second connecting joints through the associated plate aperture and installing a threaded nut on each pin. The axle and attached mounting arms are then positioned behind the motorcycle body frame and the pins of the first connecting joints are extended through the pin apertures of the motorcycle body frame to connect the mounting arms, and the rear axle, to the original motorcycle frame. A short adjustable-length tie rod is connected between the two mounting arms near their first ends to "spread" the mounting arms and prevent the pins from withdrawing from the pin apertures, since they are not otherwise restrained.

The angle of the rear axle relative to the longitudinal axis of the motorcycle frame (the "caster" of the axle) may be adjusted as needed by rotating the threaded shaft of one or more selected connecting joints relative to the mounting arm member to which each is connected. Adjustment of the connecting joints effectively shortens or lengthens the associated mounting arm, thus changing the position and angle of the rear axle. Subsequent adjustments may be made at any time after initial installation, as needed to maintain the original alignment or to change the alignment characteristics. Since the mounting system of the invention allows adjustment of the rear axle alignment, manufacturing tolerances are much less critical than with non-adjustable mounting systems and manufacturing cost can be reduced significantly.

With the axle mounting system of the invention, the lateral distance between the mounting arms is less than the lateral dimension of the original motorcycle frame, and the mounting arms lie inside the original frame boundaries, rather than outside as with prior art axle mounting structures. The narrower spread of the mounting arms of the present invention provides a significant increase in the area available for the feet and legs of a motorcycle passenger as compared to the area remaining after encroachment of the prior art mounting structures into the passenger space. The narrower width of the mounting system of the invention also preserves the visual "lines" of the original motorcycle design, enhancing the appearance of the final three wheel structure.

The structure and features of the preferred embodiment of the rear axle mounting apparatus and system of the invention will be described in specific detail with reference to the accompanying drawing figures.

DETAILED DESCRIPTION OF THE PREFERRED EMBODIMENT

Referring now to the drawing figures, with initial emphasis on FIGS. 1 through 4, the preferred embodiment of the mounting apparatus of the invention includes a pair of mounting arms, generally designated by reference numeral 10, and a pair of mounting plates, generally designated by numeral 30. A first connecting joint 40 is connected to the first end of each mounting arm, and a pair of second connecting joints 50 is connected to respective members of the second end of each mounting arm. The mounting arms, mounting plates, and associated connecting joints of each pair are essentially identical, and it will be understood unless otherwise indicated that the following component descriptions are generally applicable to all like components. If differentiation between left and right components is necessary for understanding of the description, "L" and "R" designations will be added to reference numerals for "left" and "right" components, respectively. Reference numerals in the "100 series" are used to identify components of the original motorcycle and components used in the three wheel conversion but not a part of the present invention.

Figure 2:
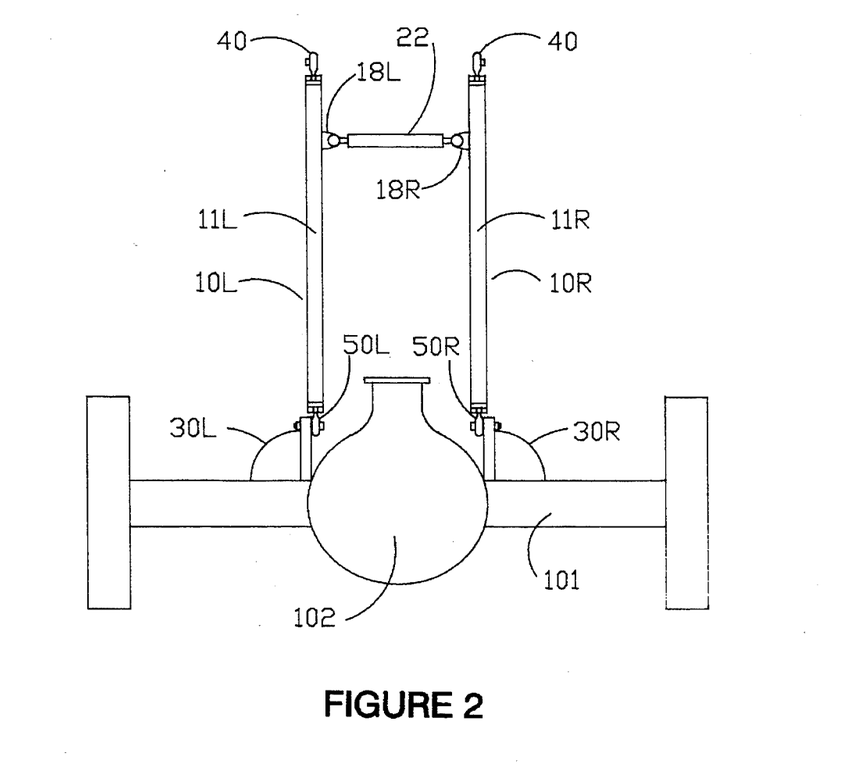
FIG. 2 is a top plan view of the preferred embodiment of the mounting assembly of the invention, showing a rear axle with the mounting assembly of the invention connected thereto.
Figure 3:
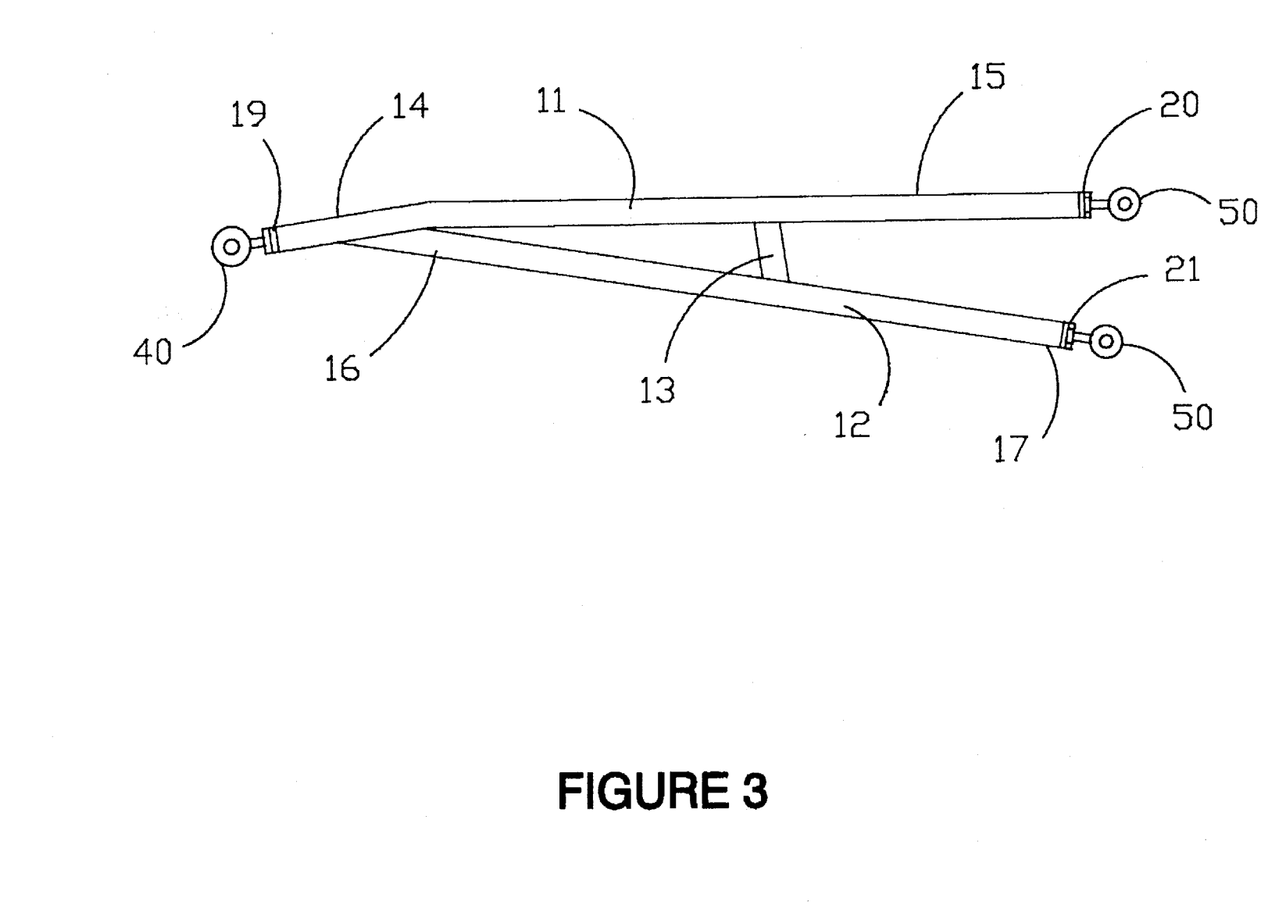
FIG. 3 is a side elevation view of the preferred embodiment of a mounting arm of the mounting assembly of the invention.

Each mounting arm 10 is generally configured in an "A-frame" shape and includes an upper frame member 11, a lower frame member 12, and a connecting member 13. Upper frame member 11 is an elongate member with a first end 14 and a second end 15, and lower frame member 12 is an elongate member with a first end 16 and a second end 17. Lower frame member 12 is connected at its first end to upper frame member 11 near its first end, and the lower frame member extends alongside the upper frame member at an angle. Connecting member 13 extends between the upper and lower frame members to provide strength and rigidity to the mounting arm structure. A tie rod mounting tab 18 is connected to upper frame member 11 near the intersection of upper frame member 11 and lower frame member 12, and extends outwardly from upper frame member 11 in a plane perpendicular to the plane defined by the frame members 11, 12, and 13. As indicated in FIG. 2, tab 18 is connected to opposite sides of each mounting arm of the pair, and differentiates between a left mounting arm 10L and a right mounting arm 10R, with upper frame members 11L and 11R and with tabs 18L and 18R, respectively. In the preferred embodiment frame members 11, 12, and 13 are hollow tubes, but solid rods or any other form that provides sufficient strength and rigidity, and that accommodates connecting joints 40 and 50 may be used.

The first and second ends of upper frame member 11 and the second end of lower frame member 12 are open and are adapted to receive a threaded shaft associated with connecting joints 40 and 50. The adaptation to receive the threaded shafts is preferably made by connecting threaded nuts 19 and 20 to the first and second ends 14 and 15 of upper frame member 11 and connecting threaded nut 21 to second end 17 of lower frame member 12, but it will be understood that other means may be used, such as threading the inner wall of the open ends of tubular members or forming threaded apertures in the ends of solid members.

Figure 1:
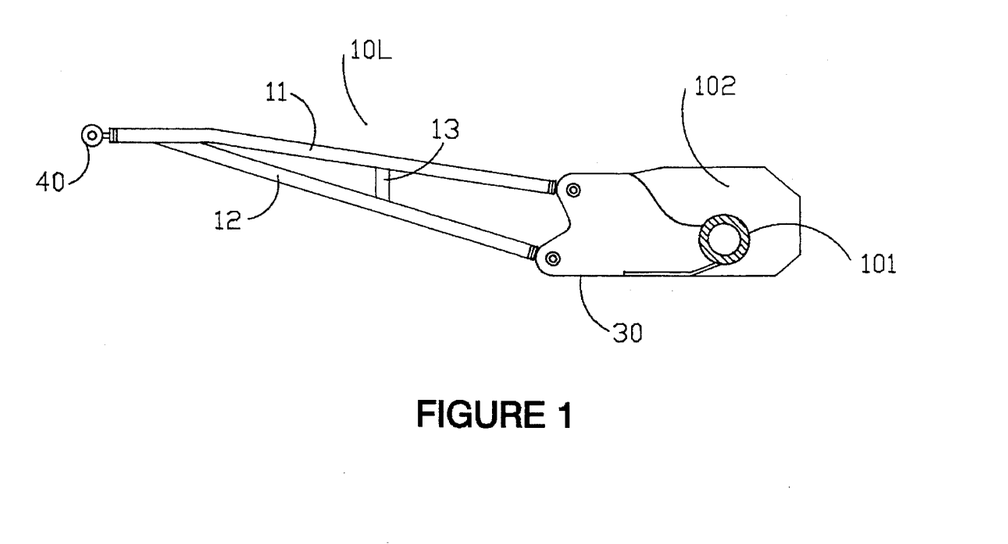
FIG. 1 is a side elevation view of the preferred embodiment of the mounting assembly of the invention, showing a portion of a rear axle with the mounting assembly of the invention connected thereto.
Figure 4:
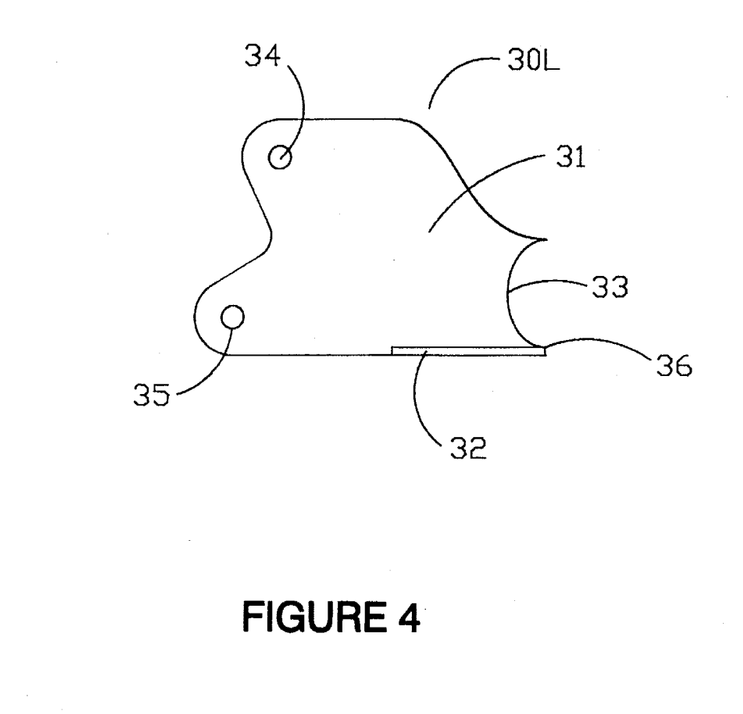
FIG. 4 is a side elevation view of the preferred embodiment of a left mounting plate of the mounting assembly of the invention.
Figure 5:
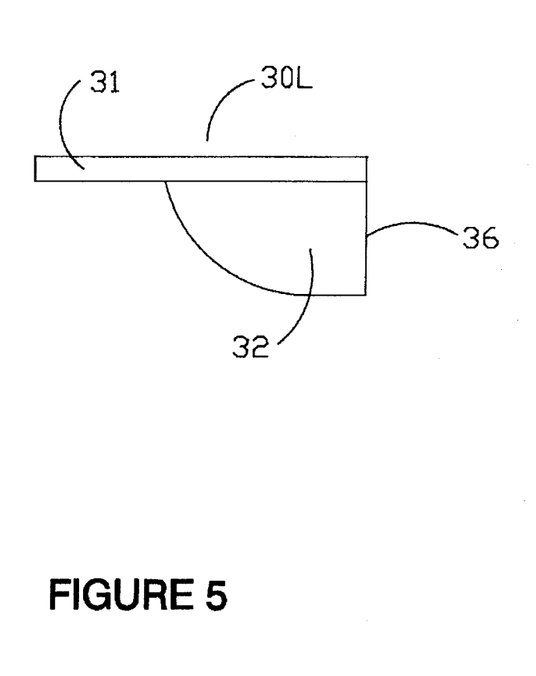
FIG. 5 is a top plan view of the preferred embodiment of a left mounting plate of the mounting assembly of the invention.
Figure 8:
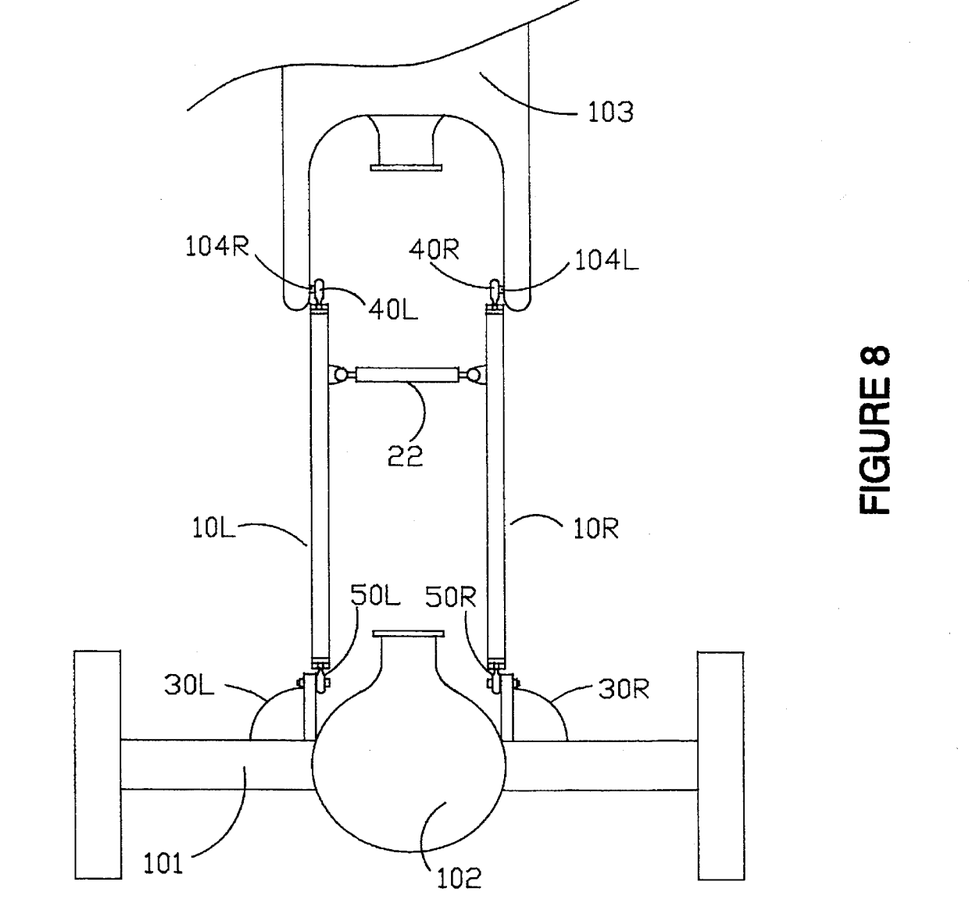
FIG. 8 is a schematic illustration of the placement of the mounting arms of the mounting assembly of the invention relative to a portion of the original frame of a motorcycle.

Mounting plates 30 are connected to a rear axle 101, as illustrated in FIGS. 1, 2, and 8, and provide mounting points for connection of mounting arms 10 to the axle which has a center point, a longitudinal axis, and first and second ends. A left mounting plate, 30L, of the preferred embodiment is illustrated in FIGS. 4 and 5. The left and right plates include the same components, in mirrored configuration, and the following description of the left mounting plate is equally applicable to the right mounting plate. Mounting plate 30 includes a main plate 31 and a reinforcing plate 32 interconnected to the lower edge of main plate 31 and extending outwardly therefrom in generally perpendicular relation. Main plate 31 is formed with a contoured rear edge 33, shaped to match the contour of the rear axle 101 for connection of the mounting plate to the axle. The opposite edge of main plate 31 includes upper aperture 34 and lower aperture 35, for connection of upper member 11 and lower member 12, respectively, of the associated mounting arm 10. The pair of mounting plates 30 are positioned on axle 101 on either side of differential 102 between the center point and the respective first and second ends of axle 101, with each set of apertures 34L and R and 35L and R in respective coaxial alignment on an axis parallel to the longitudinal axis of axle 101. The mounting plates are securely connected to axle 101, preferably by welding along edge 33 of the main plate and rear edge 36 of the reinforcing plate. It is important that mounting plates 30 be properly positioned on axle 101 so that drive shaft connections and mounting connections between the axle and the original motorcycle frame will be in correct alignment. It is also important that mounting plates 30 be securely connected to axle 101, to ensure the structural integrity of the final three wheel motorcycle vehicle.

Figure 9:
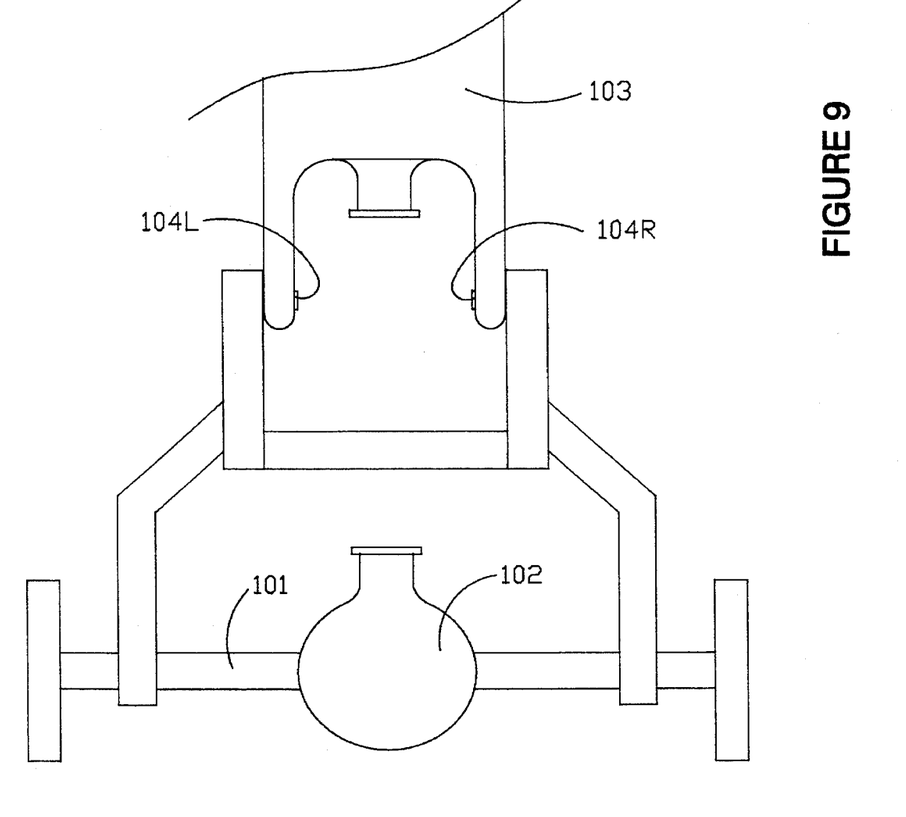
FIG. 9 is a schematic illustration of the placement of a prior art axle mounting assembly relative to a portion of the original frame of a motorcycle.

Connection between the original motorcycle frame and rear axle 101 is made by connecting mounting arms 10 between mounting plates 30 and the original motorcycle frame, after removal of the original rear wheel assembly from the motorcycle. As schematically shown in FIGS. 8 and 9, the original motorcycle frame includes a yoke 103 with mounting points 104L and 104R to which the first ends of upper frame members 11 of mounting arms 10 are connected. The connection of mounting arms 10 to mounting points 104 is made through first connecting joints 40, and the connection of mounting arms 10 to mounting plates 30 is made through second connecting joints 50.

Figure 6:
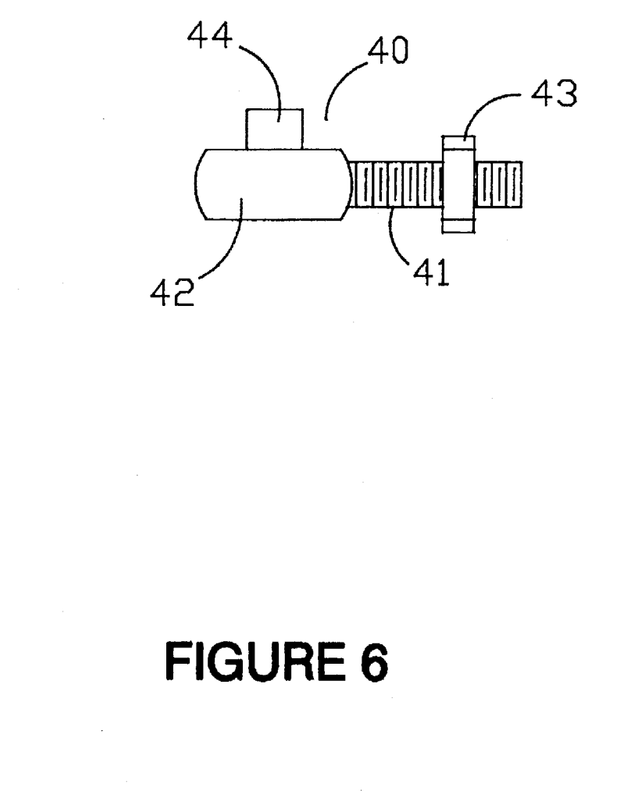
FIG. 6 is a top view of a first connecting joint of the preferred embodiment of the invention.
Figure 7:
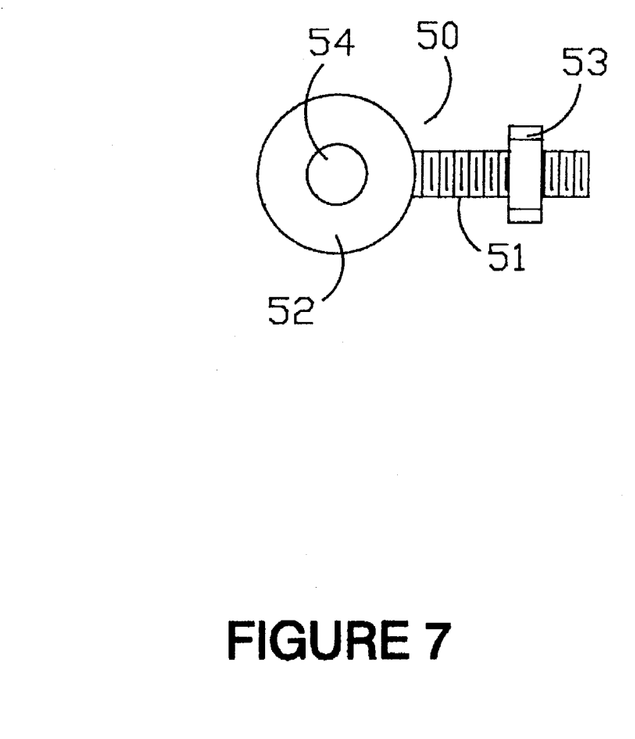
FIG. 7 is a side view of a second connecting joint of the preferred embodiment of the invention.

Connecting joints 40 and 50 are of very similar construction, and differ only in the manner in which they are connected to mounting points 104 and to mounting plates 30, respectively. The connecting joints of the preferred embodiment, described below, are commercially available, and are sometimes referred to by the trade name "Heim Joints". Each connecting joint includes a threaded shaft 41 or 51 and a head 42 or 52, connected to the threaded shaft through a swivel connection, so that the head is allowed to rotate around the longitudinal axis of the shaft. Shaft 41 extends into the first end of upper frame member 11 through nut 19, shaft 51 of one second connecting joint extends into the second end of member 11 through nut 20, and shaft 51 of another second connecting joint extends into the second end of lower frame member 12 through nut 21. Lock nuts 43 and 53 are provided to lock shafts 41 and 51, respectively, in a selected position. Each first connecting joint 40 includes a pin 44 connected to head 42 and extending outward therefrom perpendicular to shaft 41, to mate with mounting points 104 of the original motorcycle frame. Second connecting joints 50 each include an aperture 54 extending through head 52 with the axis of aperture 54 perpendicular to shaft 51.

In the system of the invention, the rear axle mounting apparatus is positioned so that the lateral distance between mounting arms 10L and 10R is less than the width of yoke 103 of the original motorcycle frame, minimizing the useable rider space occupied by the mounting apparatus and maintaining the aesthetic lines of the original motorcycle design as much as possible. The apparatus is used by properly positioning mounting plates 30 on the rear axle assembly for proper alignment with the original motorcycle structure, and connecting mounting plates 30 to the axle. Proper component alignment may be achieved by loosely connecting mounting arms 10 to mounting plates 30, loosely connecting the first ends of mounting arms 10 to mounting points 104, placing the rear axle in position, marking the position of mounting plates 30 relative to the axle, and then welding plates 30 to the axle. Any other convenient alignment procedure may also be used, at the discretion of the person performing the assembly operations.

With mounting plates 30 connected to the rear axle, each mounting arm 10 is connected to the associated mounting plate by aligning apertures 54 of second connecting joints 50 with apertures 34 and 35 of the mounting plate and extending a bolt through each set of aligned apertures. Each mounting arm 10 is connected to the original motorcycle frame by extending pin 44 of each first connecting joint 40 into the pin sleeve or aperture associated with mounting points 104 of yoke 103. A tie rod 22 is connected between tabs 18L and 18R to maintain the separation between mounting arms 10L and 10R and prevent removal of pins 44L and 44R from the mounting points 104L and 104R. Tie rod 22 is adjustable in length to allow the system to accommodate differences in the dimensions of various motorcycle frames, and to allow precise control of the connection between the mounting apparatus of the invention and the original motorcycle frame. Adjustable length tie rods, in general, are well understood and commonly used, and any conventional tie rod structure may be used, so long as the tie rod structure will maintain the length to which it is adjusted during installation of the mounting apparatus.

FIG. 9 provides a schematic illustration of the configuration of a prior art axle mounting apparatus and its connection to a motorcycle, for comparison to the configuration and connection of the apparatus of the invention illustrated in FIG. 8. In the prior art approach the rear axle mounting apparatus is connected to the motorcycle frame on the outside of yoke 103 and occupies space that would otherwise be available to a rider. Further, the prior art systems and apparatus provide no adjustment means, so extremely precise control of the manufacturing and assembly processes is required for proper alignment of the rear axle.

In the system of the invention, the rear axle alignment may be readily adjusted at any time, both during and after assembly. Adjustment of the "caster" (alignment of the rear axle axis relative to the motorcycle axis) is made by adjusting the position of first connecting joints 40 and/or second connecting joints 50 relative to mounting arms 10. Such adjustments are made by threading a shaft 41 or shafts 51 in or out relative to the ends of the respective frame members of mounting arm 10, thereby shortening or lengthening the adjusted mounting arm, and tightening the respective lock nuts to secure the position. Since the mounting system of the invention is adjustable, much less precision is required in manufacture of the apparatus, and the manufacturing cost can be significantly reduced. Further, the ability to adjust the alignment after initial assembly facilitates the assembly process by reducing the precision required in connecting the mounting apparatus to the rear axle. Especially since most motorcycle conversions are performed by the end user using conversion apparatus provided in kit form, the adjustability feature of the system is a very significant advancement in the art.

The foregoing description of the preferred embodiment of the invention is illustrative and not for purposes of limitation. Various alternatives to the preferred embodiment have been mentioned in the description, and it should be understood that a variety of further alternative embodiments and modifications may be made to the apparatus without departing from the scope of the invention as described and claimed.

I claim:

1. An apparatus for adjustably mounting a rear axle assembly to the existing frame of a two wheeled motorcycle so as to create a three wheeled motorcycle, with the rear axle assembly having a longitudinal axis, a center point, and opposite ends, and with the existing frame having a longitudinal axis and a pair of mounting points symmetrically disposed on either side of the longitudinal axis of the existing frame comprising a pair of mounting plates interconnected to a rear axle, said rear axle having a longitudinal axis, a center point, and first ands second ends, with one of said mounting plates disposed between said center point of said rear axle and said first end of said rear axle and with the other of said mounting plates disposed between said center point of said rear axle and said second end of said rear axle;

a pair of elongate mounting arms, each of said mounting arms having a first end and a second end, and each of said mounting arms connected between one of said mounting plates and one of the mounting points of an existing motorcycle frame, with said first end mounting arm interconnected to one of said mounting points of said existing frame and with said second end of each mounting arm interconnected to one of said mounting plates such that said mounting arm is generally parallel to said longitudinal axis of said existing frame; and adjustment means for adjusting the length of said mounting arms for the purpose of adjusting the alignment of said longitudinal axis of said rear axle relative to said longitudinal axis of said existing frame.

* * * * *